Jan. 23, 1945. E. G. FASSEL 2,367,673
PHOTOGRAPHIC RECORDING METHODS AND EQUIPMENT
Filed Jan. 24, 1942
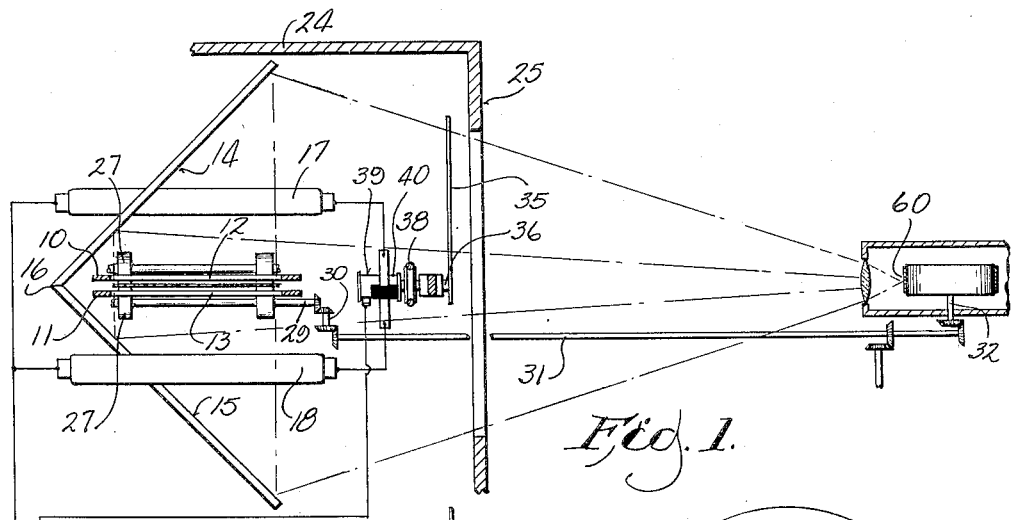
Fig. 1.
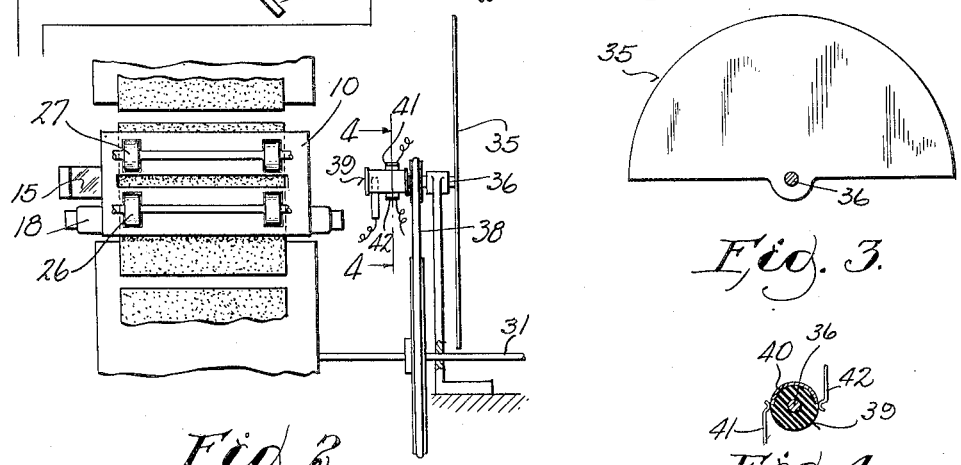
Fig. 2.
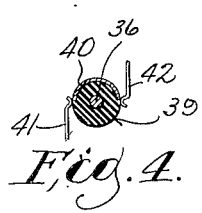
Fig. 3.
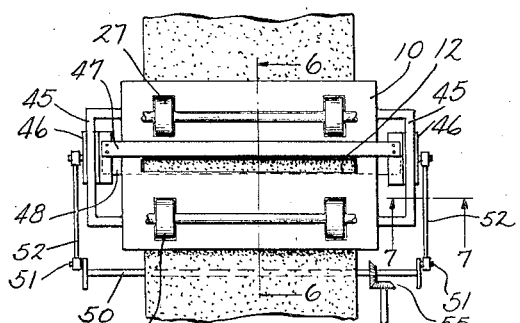
Fig. 5.
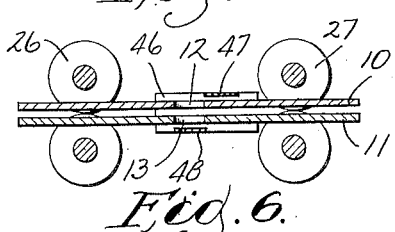
Fig. 4.
Fig. 6.
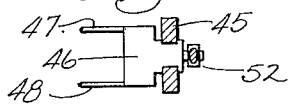
Fig. 7.
INVENTOR
ELGIN G. FASSEL
BY
Wheeler, Wheeler & Wheeler
ATTORNEYS Patented Jan. 23, 1945

2,367,673

UNITED STATES PATENT OFFICE 2,367,673

PHOTOGRAPHIC RECORDING METHOD AND EQUIPMENT

Elgin G. Fassel, Milwaukee, Wis.

Application January 24, 1942, Serial No. 428,025

11 Claims. (Cl. 95—5)

My invention relates to improvements in photographic recording methods and equipment, with particular reference to means for obtaining paired pictures of the obverse and reverse sides of moving documents and similar translucent or transparent objects containing data on both sides thereof.

In my former patent, No. 2,177,135, dated October 24, 1939, I have disclosed a means for obtaining such paired pictures by passing the documents or other objects through a feedway having opaque top and bottom walls provided with viewing slots or apertures which are offset with reference to each other in the respective walls, whereby documents in motion can be photographed panoramically while traversing the slotted areas, the images being transferred by obliquely placed mirrors to a correspondingly moving sensitized screen. The photographs may thus be imprinted in parallel relation to each other on opposite sides of the longitudinal center line of the film. By having the exposure apertures offset in the upper and lower walls of the feedway, confusion of images is avoided, since the light rays illuminating the exposed portion of one side of the document are out of line with the illuminated area on the other side.

The object of the present invention is to provide means whereby similar clear, unobscured, paired photographs can be taken of documents passing through an opaque feedway having exposure apertures in registry with each other.

In the drawing:

Figure 1 is a conventional illustration, in side elevation, of portions of photographic recording equipment of the described class, showing my invention embodied therein.

Figure 2 is a fragmentary plan view of a document feedway and associated parts embodying my invention.

Figure 3 is a detail view of a simi-circular rotatable shutter, of which edge views appear in Figures 1 and 2.

Figure 4 is a detail sectional view, drawn to line 4—4 of Figure 2, and showing a lamp controlling commutator associated with said rotatable shutter.

Figure 5 is a plan view showing a modification in which a set of oscillatory shutters and shutter actuating mechanism are used to close and open the feedway slots in alternation.

Figures 6 and 7 are sectional views, drawn respectively to lines 6—6 and 7—7 of Figure 5.

Like parts are identified by the same reference characters throughout the several views.

In Figures 1, 2 and 3, I have illustrated a document feedway having upper and lower opaque walls 10 and 11, respectively provided with registering exposure slots 12 and 13, as clearly shown in Figure 6. Oppositely inclined obliquely disposed upper and lower reflectors or mirrors 14 and 15 diverge from a common apex at 16 above and below the respective slots 12 and 13. These mirrors occupy a common vertical plane, which includes the axes of said exposure slots.

Fluorescent lamps 17 and 18 are employed to illuminate the obverse and reverse sides of a document traversing the feedway across the exposure slots, whereby images of the exposed surfaces may be projected through the lens of the camera. The feedway lamps and mirrors may be enclosed in a suitable housing similar to that disclosed in my said former patent, fragments 24 and 25 of such a housing being shown in Figure 1. Also, as disclosed in my said former patent, the feedway is provided with sets of infeeding rollers 26 and outfeeding rollers 27. The infeeding rollers may be driven from any suitable source of power also used to continuously feed the film of the camera. In Figure 1, I have illustrated motion transmitting shafts 29, 30, 31 and 32, having gear connection with each other, whereby the documents and the sensitized film may be actuated at the proper speeds and in opposite directions.

All of the foregoing parts may be constructed and arranged substantially as disclosed in my said former patent, except that the slots 12 and 13 in the feedway are in registry, i. e., the slot 12 is directly above the slot 13. Tubular lamps 17 and 18 are preferably employed and disposed parallel to the respective slots. The arrangement is preferably such that the lamps may be turned "on" and "off" with sufficient frequency to enable all particles of the document surfaces in any single transverse line to be equally illuminated more than once while crossing the slotted area in continuous movement. The elongated lamps ensure equal illumination along any such line, and by employing incandescent vapor lamps having the desired characteristics, substantially instant and complete illumination and instant and complete blackouts are possible as the lamps are turned "on" and "off."

Between the feedway and the camera, I interpose a revoluble semi-circular shutter 35 mounted on a shaft 36, which is located substantially in the central horizontal plane of the feedway, whereby the shutter will alternately intercept rays of light passing from the respective mirrors to the camera. The shaft is driven at the required speed, from any suitable source of power. In the construction illustrated, a belt 38 is employed to drive shaft 36 from shaft 31. The pulley on shaft 36 may be of relatively small size as compared with that on shaft 31, and their diameters so proportioned that shaft 36 may be driven at the required higher speed.

Shaft 36 is provided with a lamp controlling commutator hub 39, having an arcuate terminal 40 which alternately registers with the left and right brushes 41 and 42 in an electrical circuit including the upper and lower lamps 17 and 18, respectively. The arrangement is such that when either lamp is illuminated the other one will not only be disconnected from the electrical circuit, but the screen 35 will be interposed to prevent rays of light passing through the document to the dark side from being reflected by the associated mirror to the camera. Confusion of images and obscuration of the photographs is thus prevented.

By rotating the shaft 36 at a proper speed, the lamps may be turned "on" and "off" with such frequency as to obtain proper and equal degrees of exposure for every portion of the document successively exposed through the slots while traversing the feedway, and equally sharp and clearly defined photographs of each side of the document can thus be obtained. The lights are both "off" while the shutter is moving from one slot obscuring position to another, since the commutator terminal 40 is less than a half cylinder. The frequency of exposure is preferably such, with reference to the rate of work movement, as to provide for overlapping exposures, the film being moved at a corresponding rate so that the successive flash images will overlap or at least marginally register and appear as a single image on the screen. In other words, the rate of shutter and synchronized flash movement must be such as to imprint the images at least consecutively with no gaps.

The modified feedway shown in Figure 5 is adapted to be substituted for the feedway shown in Figures 1 and 2, all other portions of the apparatus being the same, although, if desired, when a feedway of the type shown in Figure 5 is used, the shutter 35 with its shaft and commutator may be omitted.

In Figure 5, fixed guide bars 45 are mounted at the sides of the feedway and provided with slides 46 connected with each other above and below the feedway by bars 47 and 48, which are offset with reference to each other, as best shown in Figure 6. Each of these bars 47 and 48 is wide enough to serve as a shutter to completely cover the associated slot in the feedway when in registry therewith, and therefore the bars are adapted to alternately close one or the other of the slots 12 and 13. For this purpose the slides 46 may reciprocate a distance equal to the width of one of the bars. Motion for this purpose may be transmitted to the slides from a shaft 50, cranks 51, and connecting rods 52. If desired, shaft 50 may be actuated at the desired speed from shaft 31 through appropriate gearing 55.

The cranks cross the plane of slide reciprocation twice during each revolution, at which times the shutter bars 47 and 48 will momentarily dwell, with one of them in a position completely covering its associated slot and the other one in a position with its slot completely uncovered. From these positions the slides will move with such speed across the respective slots that the lamps may be continuously illuminated without material effect upon the sensitized film of rays of light which penetrate the document during the extremely short interval while the shutter bars 47 and 48 are being shifted. Therefore, in this modified construction, neither the commutator for controlling the lamps nor the shutter 35 will be required, although they may be used if desired.

The camera is a continuous camera, similar to that disclosed in my former Patent No. 2,177,135, and the film 60 is continuously driven in synchronism with the document feeding and shutter actuating mechanism. The shaft 31 may therefore be operatively connected with the drum which actuates the film 60, and the relative rates of speed determined by the gear ratio in the proportion that the length of the document bears to its photograph appearing on the film. The driving connections are merely indicated conventionally, the requirements for specific selection of shafts and gearing being well known to those skilled in this art.

In each of the constructions illustrated, light is transmitted to the moving film from a moving document alternately from opposite sides of the document while all rays moving from the other side are being excluded, regardless of the origin of such rays. Nothing in the nature of instantaneous exposure is required because of the corresponding movement of both object and film and operation on the panoramic principle. The successive images preferably overlap in registration.

I claim:

1. In equipment for obtaining unobscured paired spaced apart photographs of the obverse and reverse sides of documents in motion, the combination with a camera, of a document feedway in the photographic field of a camera, means for propelling documents through said feedway, means for illuminating opposite sides of a document traversing such feedway, an obliquely placed mirror on each side of the feedway, positioned for reflection of exposed faces of the document to the lens of the camera to produce separate spaced-apart images, and power driven shutter means for alternately preventing rays of light from simultaneously reaching the camera from both sides of the document, said shutter means being operable at sufficient frequency to allow adequate and substantially equal exposure of both faces of a document traversing such photographic field.

2. Equipment for obtaining paired spaced-apart photographs of the obverse and reverse sides of moving documents upon a correspondingly moving sensitized film, comprising the combination with a camera having means for continuously advancing a sensitized film in image receiving relation to the camera lens, of a document feedway having opaque walls provided with slots extending transversely of the line of document movement in position for simultaneous exposure of both faces of the document as it crosses said slots, means for actuating the documents and the sensitized film of the camera in synchronism, oblique reflectors positioned to simultaneously project rays of light to the camera from the exposed faces of the document said rays forming separate paths and spaced-apart images in the camera, and power driven means for alternately interrupting the rays from the respective exposed faces while the document is traversing said slots.

3. In photographic recording equipment including means for continuously advancing documents through the photographic field of a camera and means for projecting to a single lens of such camera rays of light reflected from the obverse and reverse sides of documents and similar objects to form separate spaced-apart images, the combination of shutter means, movable into and out of the path of the rays so reflected, and power driven connections for actuating the shutter means to alternately intercept the rays reflected from the respective sides of the document, and prevent simultaneous photographing of the exposed portions of both sides.

4. In photographic recording equipment of the described class wherein separate spaced-apart images of the obverse and reverse sides of a document are photographed, shutter means for alternately blocking the reflection of rays of light to a camera from opposite sides of a moving document, in combination with power driven connections for moving the camera film, the document, and the shutter means in synchronism, said shutter means being rotatable on an axis between the paths of the rays from opposite sides of the document, and of an area to alternately intercept and expose such paths.

5. In photographic recording equipment for obtaining spaced-apart paired photographs of the obverse and reverse sides of a moving document upon a correspondingly moving sensitized film, including a feedway having slots on opposite sides for progressive exposure of both sides of a moving document in the photographic field of a camera having such a film, the combination with such feedway of movable shutter means for blocking rays of light reflected from the respective faces of the exposed portions of a document in the feedway, and power driven means for actuating said shutter means to alternately block such light rays while any given portion of the document is crossing said slots.

6. In equipment for obtaining paired photographs of the obverse and reverse sides of moving documents upon a correspondingly moving sensitized film, the combination with a document feedway having opaque walls provided with registering exposure slots above and below the path of the documents, electric lamps above and below the feedway for illuminating the exposed portions of the documents passing therethrough, mirrors for projecting beams of light from the upper and lower faces of the exposed portions of documents to a camera along convergent lines, a rotary substantially semi-circular shutter in a position to alternately intercept the respective beams, and a commutator for making and breaking the circuits of said lamps with the same frequency and in reverse order, whereby the screen will be effective to intercept rays which penetrate the document from the illuminated side.

7. In equipment of the described class wherein separate spaced-apart images of the obverse and the reverse sides of a document are photographed, the combination with a document feedway provided with opaque walls and transverse exposure slots, of a set of mutually offset shutter screens respectively positioned on opposite sides of the feedway, and means for actuating said shutter screens at high frequency to alternately open and close the respective slots.

8. A camera having a sensitized film and means for actuating it continuously in image receiving relation to the camera lens, means for directing beams of light through the lens from opposite sides of an object to opposite sides of the longitudinal center line of the film to form spaced-apart images thereon, and a shutter mounted between the camera and the object and adapted to alternately intercept said beams.

9. The method of photographing documentary records, consisting in progressively exposing successive portions of the obverse and reverse sides of a document while moving it continuously across the photographic fields of a camera, simultaneously moving a sensitized film at a corresponding rate in a position to receive successive parallel imprints of said exposed portions, and intermittingly and with high frequency alternately interrupting rays of light which would otherwise reach the camera from the respective sides of the document, to prevent simultaneous transmission to the camera of rays from both sides of said document.

10. The method of photographing documentary records, consisting in moving a document continuously across a photographic field, and exposing a correspondingly moving sensitized film intermittingly to rays of light coming from one side of such document to one side of the longitudinal center line of the film, with such frequency as to obtain a continuous imprint of the moving document, and alternately exposing the film at the opposite side of said center line to rays of light coming from the other side of the document.

11. The method of producing unobscured paired spaced-apart photographs of the obverse and reverse sides of the same portion of a moving document upon a correspondingly moving sensitized film, consisting in reflecting beams of light from the respective sides of the document along lines converging to the object glass of a camera, and alternately blocking said beams with high frequency during an image imprinting period.

ELGIN G. FASSEL.